(12) United States Patent
Nevinsky et al.

(10) Patent No.: US 11,767,770 B2
(45) Date of Patent: Sep. 26, 2023

(54) DOUBLE BIPOD FITTING TO MITIGATE THERMAL LOADING OF ENGINE EXHAUST STRUCTURES

(71) Applicant: The Boeing Company, Chicago, IL (US)

(72) Inventors: Michael D. Nevinsky, Philadelphia, PA (US); David T. Misciagna, West Chester, PA (US); Joseph Orso, Glen Mills, PA (US); Robert A. DiChiara, Jr, Carlsbad, CA (US); Marc Daniel Spiccia Karasek, Media, PA (US)

(73) Assignee: The Boeing Company, Chicago, IL (US)

(*) Notice: Subject to any disclaimer, the term of this patent is extended or adjusted under 35 U.S.C. 154(b) by 18 days.

(21) Appl. No.: 17/444,759

(22) Filed: Aug. 10, 2021

(65) Prior Publication Data

US 2023/0052326 A1 Feb. 16, 2023

(51) Int. Cl.
*F01D 25/24* (2006.01)
*F02K 1/80* (2006.01)

(52) U.S. Cl.
CPC .............. *F01D 25/243* (2013.01); *F02K 1/80* (2013.01); *F05D 2220/323* (2013.01); *F05D 2240/14* (2013.01)

(58) Field of Classification Search
CPC ......... F01D 25/243; F01D 25/26; F01D 25/28; F02K 1/80; F02K 1/805; F02C 7/20; F02C 7/28; F05D 2260/30; F05D 2260/941; B64D 33/04

See application file for complete search history.

(56) References Cited

U.S. PATENT DOCUMENTS

| | | | |
|---|---|---|---|
| 5,592,814 A * | 1/1997 | Palusis et al. | F16B 5/0241 60/770 |
| 8,328,453 B2 | 12/2012 | Keith et al. | |
| 8,726,675 B2 | 5/2014 | Keith et al. | |
| 8,834,056 B2 | 9/2014 | Keith et al. | |
| 2010/0205930 A1* | 8/2010 | Conete et al. | F02K 1/04 29/889.22 |
| 2019/0136718 A1* | 5/2019 | Ramlaoui et al. | B60K 13/04 |
| 2021/0396153 A1* | 12/2021 | Danis et al. | F01D 25/005 |

* cited by examiner

*Primary Examiner* — Andrew H Nguyen
(74) *Attorney, Agent, or Firm* — Yee & Associates, P.C.

(57) ABSTRACT

A system and method for mitigating thermal loading between engine exhaust structures having different coefficients of thermal expansion. The engine exhaust structure comprises a metallic duct portion, a ceramic duct portion, and a double bipod fitting joining the metallic duct portion to the ceramic duct portion. The double bipod fitting is capable of flexing and taking up the thermal expansion differences between the joined metallic and ceramic ducts across the full temperature spectrum that an engine exhaust structure will experience in service.

20 Claims, 9 Drawing Sheets

FIG. 11

DOUBLE BIPOD FITTING TO MITIGATE THERMAL LOADING OF ENGINE EXHAUST STRUCTURES

GOVERNMENT LICENSING RIGHTS

This invention was made with Government support under Prime Contract Number W31P4Q-15-D-0043 (Subcontract Number CDMM_BOA-20160052-20200011) awarded by the Department of Defense. The government has certain rights to this invention.

BACKGROUND INFORMATION

1. Field

The present disclosure relates generally to thermal couplings. More specifically, the present disclosure relates to a double bipod fitting for mitigating thermal loading of engine exhaust structures in aircraft applications.

2. Background

Currently, many aircraft engine exhaust structures, such as pipes and ducts, are constructed of stainless steel or other metals in order to sustain high exhaust temperatures. In the interest of weight savings and, as a result, savings in operation costs, ceramic matrix composite (CMC) materials can be employed as a substitute for some of the traditionally metallic exhaust pipes/ducts. Exchanging a portion of a metallic exhaust duct with a CMC exhaust duct may reduce the overall weight of an aircraft engine by approximately 50 lbs.

However, the interface between the metallic duct portion and the ceramic duct portion, where the metallic duct portion is attached to the ceramic duct portion, presents challenges due to the difference between the coefficient of thermal expansion of the two different materials. The resultant difference in thermal growth at exhaust temperatures between the two duct portions stresses the joint joining the two duct portions. A traditional lap or butt joint between the two duct portions may cause untenable stress concentrations in the ceramic duct portion causing cracking of the ceramic duct portion at the interface joint.

Therefore, it would be desirable to have a method and apparatus that takes into account at least some of the issues discussed above, as well as other possible issues.

SUMMARY

An illustrative embodiment of the present disclosure provides an engine exhaust structure comprising a metallic duct portion configured to be attached to an aft end of an aircraft engine duct and a ceramic duct portion. A double bipod fitting comprises an arc shaped base flange and is attached to the metallic duct portion. The arc shaped flange conforms to the curvature of the metallic duct portion. Each bipod of the double bipod fitting comprises leg members that extend from the arc shaped base flange and converge at a head. A spring loaded fastener attaches each head to the ceramic duct portion.

Another illustrative embodiment of the present disclosure provides a double bipod fitting configured to mitigate thermal loading of a structure having a high coefficient of thermal expansion (CTE) connected to a structure having a low CTE. The double bipod fitting includes a first bipod and a second bipod, each mounted on an arc shaped base flange. The arc shaped base flange is attached to a flange of the high CTE structure. The arc shaped base flange conforms to the curvature of the high CTE structure. The first bipod includes a first pair of leg members extending from the base flange and converging at a first head, wherein a first spring loaded fastener connects the first head to the low CTE structure. The second bipod includes a second pair of leg members extending from the base flange and converging at a second head, wherein a second spring loaded fastener connects the second head to the low CTE structure.

A further illustrative embodiment of the present disclosure provides a method for mitigating thermal loading between engine exhaust structures having different coefficients of thermal expansion. An arc shaped base flange of a double bipod fitting is attached to an engine exhaust structure having a high CTE. The double bipod fitting has a CTE similar to the CTE of the engine exhaust structure having a high CTE. A head of each bipod of the double bipod fitting is attached to an engine exhaust structure having a low CTE with a respective spring loaded fastener.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that aircraft manufacturers are designing aircraft parts, such as engine exhaust structures including exhaust pipes/ducts, with materials that are lighter than traditional metallic material with weight savings and cost savings in mind. As a result, joining the lighter materials, e.g. ceramic matrix composites (CMC) having a lower coefficient of thermal expansion (CTE) than traditional metallic components, to the remaining metallic components of the engine exhaust system presents thermal growth mismatch concerns. CMC material and metals commonly used around aircraft engines (titanium, stainless steel, Inconel®, etc.) grow at different rates when experiencing a full thermal spectrum of engine exhaust air.

The illustrative embodiments also recognize and take into account that thermal growth mismatches caused by the joining of two components having different CTEs could result in untenable stress concentrations on the joint between the two and the component having the lower CTE. Cracking of the component having the lower CTE may occur.

Thus, the illustrative embodiments provide a thermal coupling that allows for some level of displacement and takes up the thermal growth of the engine exhaust system. By including a bipod structure on each thermal coupling detail, an extra measure of hoop strength is imparted to the joint. Hoop strength is a measure of how a material or mechanical joint handles hoop stress. Hoop stress, or tangential stress, is mechanical stress defined for rotationally symmetric objects such as pipe, tubing, or ducting. Hoop stress is the stress around the circumference of the pipe or duct due to a pressure gradient. A pressure gradient can be caused by differences in thermal loading of two ducts of different CTE joined together. In high temperature environments, the material with the material with the higher CTE will expand more than the material with the lower CTE thus creating the pressure gradient at the joint and causing stress in the material of lower CTE.

The illustrative embodiments provide a double bipod thermal coupling detail designed to flex and take up the thermal expansion differences between the joined metallic and ceramic ducts across the full temperature spectrum that an engine exhaust structure will experience in service.

Figure 1:
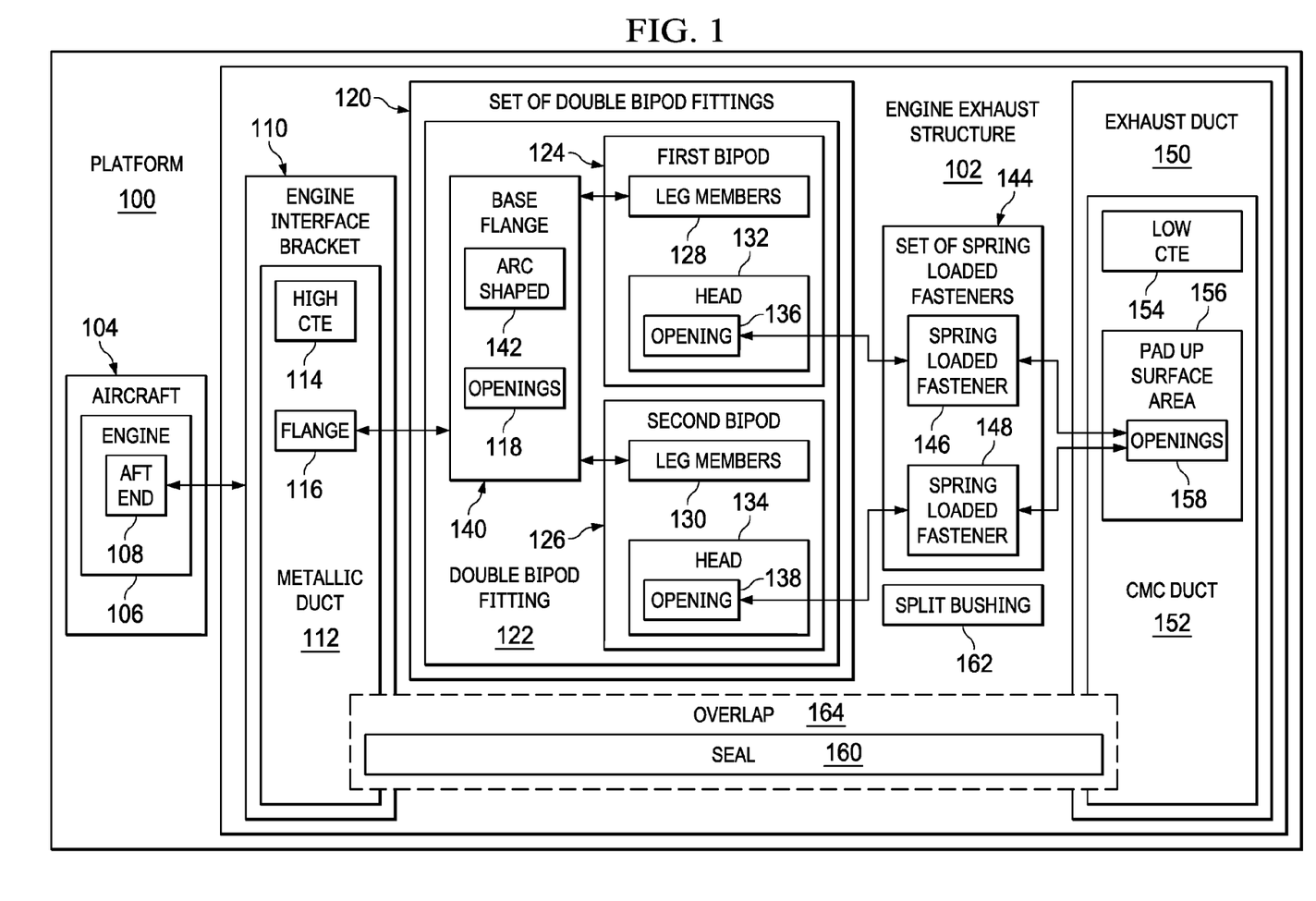
FIG. 1 is an illustration of a block diagram of a platform in accordance with an illustrative embodiment.

With reference now to the figures and, in particular, with reference to FIG. 1, an illustration of a block diagram of a platform is depicted in accordance with an illustrative embodiment. Platform 100 has engine exhaust structure 102 and aircraft 104 in this illustrative example.

Platform 100 may take a variety of different forms. For example, without limitation, platform 100 may be implemented in a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where an engine exhaust structure is desirable.

In this illustrative example, platform 100 takes the form of aircraft 104. In this illustrative example, when platform 100 takes the form of aircraft 104, engine exhaust structure 102 can be attached to aircraft 104.

In this illustrative example, engine exhaust structure 102 includes engine interface bracket 110, set of double bipod fittings 120, set of spring loaded fasteners 144, exhaust duct 150, and seal 160. As used herein, a "set of," when used with reference to items, means one or more items.

For example, a "set of double bipod fittings 120" is one or more of double bipod fittings 120.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Engine interface bracket 110 connects engine exhaust structure 102 to aircraft 104. Engine interface bracket 110 is attached to aft end 108 of engine 106 of aircraft 104 with standard shear bolt attachment points and a Marman clamp feature as is consistent with a legacy engine exhaust structure having all metallic components.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example of engine exhaust structure 102, engine interface bracket 110 takes the form of metallic duct 112 having high coefficient of thermal expansion (CTE) 114. Metallic duct 112 may be comprised of titanium, stainless steel, Inconel®, or any other metal capable of sustaining high exhaust temperatures having a CTE in the range of 7.1 - 17.3 μin/in-°F. In this illustrative example, metallic duct 112 may be fabricated of Inconel® 718 having a CTE of 7.2 μin/in-°F. Metallic duct 112 includes a vertically oriented flange 116 extending around its circumference. Flange 116 extends from metallic duct 112 in a direction substantially perpendicular to the longitudinal center axis of metallic duct 112.

In this illustrative example of engine exhaust structure 102, in order to save weight and cost, exhaust duct 150 takes the form of ceramic matrix composite (CMC) duct 152 having low CTE 154. CMC materials can be employed as a substitute for some metallic pipes/ducts of traditional engine exhaust structures. CMC materials may consist of ceramic fibers embedded in a ceramic matrix. The fibers and the matrix both can consist of any ceramic material, whereby carbon and carbon fibers can also be regarded as a ceramic material. In this illustrative example, CMC duct 152 may be comprised of CMC materials having a CTE in the range of 2.7 - 4.4 μin/in-°F. In this illustrative example, CMC duct 152 may be fabricated of Nextel™ AS-N720 having a CTE of 3.3 μin/in-° F.

CMC duct 152 includes pad up surface area 156. Pad up surface area 156 includes additional thickness stacked on top of a base laminate thickness of CMC duct 152. Pad up surface area 156 provides reinforcement and further includes openings 158. Openings 158 are sized to receive a spring loaded fastener of set of spring loaded fasteners 144 in order to attach double bipod fitting 122 to CMC duct 152.

Set of double bipod fittings 120 includes double bipod fitting 122. Set of double bipod fittings 120 may be connected to engine interface bracket 110 and exhaust duct 150. Set of double bipod fittings 120 provide a thermal coupling between engine interface bracket 110 and exhaust duct 150.

In this illustrative example, set of double bipod fittings 120 are attached to both metallic duct 112 and CMC duct 152 to provide a thermal coupling of metallic duct 112 to CMC duct 152. Set of double bipod fittings 120 are equally spaced around the circumferences of both metallic duct 112 and CMC duct 152. Each bipod of set of double bipod fitting 122 is configured to flex in a single radial direction in order to accommodate a difference in thermal expansion between metallic duct 112 having high CTE 114 and the CMC duct 152 having low CTE 154 across the full temperature spectrum that engine exhaust structure 102 will experience during operation of aircraft 104.

Set of double bipod fittings 120 includes double bipod fitting 122. In this illustrative example, double bipod fitting 122 comprises base flange 140, first bipod 124, and second bipod 126. Double bipod fitting 122 may be fabricated of Inconel® 625. Base flange 140 has arc shape 142. Arc shape 142 is conformal to a circumferential curvature of metallic duct 112. Base flange 140 includes openings 118 equally spaced through its arc shaped length. Openings 118 are used to mount base flange 140 to flange 116 of metallic duct 112 with bolts in a tension joint. First bipod 124 includes leg members 128 extending distally from base flange 140 and converging at head 132. Head 132 includes opening 136 sized to receive spring loaded fastener 146 of set of spring loaded fasteners 144 in order to attach head 132 of first bipod 124 to CMC duct 152. Opening 136 is axially aligned with one opening of openings 158 in pad up surface area 156 of CMC duct 152. Second bipod 126 includes leg members 130 extending distally from base flange 140 and converging at head 134. Head 134 includes opening 138 sized to receive spring loaded fastener 148 of set of spring loaded fasteners 144 in order to attach head 134 of second bipod 126 to CMC duct 152. Opening 138 is axially aligned with one opening of openings 158 in pad up surface area 156 of CMC duct 152.

Under the high exhaust temperatures present during operation of aircraft 104, leg members 128 and 130 of the bipods experience local displacement to take up the thermal expansion differences between metallic duct 112 having high CTE 114 and CMC duct 152 having low CTE 154. The displacement of the leg members of the bipods allows for metallic duct 112 to grow/expand at a different rate from CMC duct 152 while the bipods stay adequately connected and sealed to both metallic duct 112 and CMC duct 152 without causing undue stress on either component. Two bipods on each double bipod thermal coupling detail allow for thermal growth while still maintaining a level of hoop strength that protects against buckling.

In this illustrative example, set of spring loaded fasteners 144 includes spring loaded fastener 146 and spring loaded fastener 148. For example, set of spring loaded fasteners 144 may incorporate Bellville washers or any other spring loaded fastening system. Spring loaded fastener 146 and spring loaded fastener 148 are used to directly attach double bipod fitting 122 to CMC duct 152. Spring loaded fastener 146 and spring loaded fastener 148 allow for fastener torque or preload on the fastener to be maintained throughout the temperature spectrum that engine exhaust structure 102 will experience during use of aircraft 104.

In this illustrative example, spring loaded fastener 144 is for attachment of head 132 of first bipod 124 to pad up surface area 156 of CMC duct 152 while spring loaded fastener 148 is for attachment of head 134 of second bipod 126 to pad up surface area 156 of CMC duct 152. The spring loaded fasteners allow preload on the connection between each bipod and the component having the lower CTE, for example CMC duct 152, to be maintained throughout the temperature spectrum that engine exhaust structure 102 will experience during use.

First bipod 124 is attached to CMC duct 152 at a single point. To attach first bipod 124 to CMC duct 152, spring loaded fastener 144 passes through opening 136 of head 132 and an opening of openings 158 in pad up surface area 156 of CMC duct 152. Opening 136 is axially aligned with a respective opening of openings 158. Second bipod 126 is attached to CMC duct 152 at a single point. To attach second bipod 126 to CMC duct 152, spring loaded fastener 148 passes through opening 138 of head 134 and an opening of openings 158 in pad up surface area 156 of CMC duct 152. Opening 138 is axially aligned with a respective opening of openings 158. A spring loaded fastener passes through axially aligned openings in the ceramic pad up surface area and the head of each bipod.

In this illustrative example, split bushing 162 is positioned within the axially aligned openings of first bipod 124 and pad up surface area 156 of CMC duct 152. Split bushing 162 is positioned within the axially aligned openings of second bipod 126 and pad up surface area 156 of CMC duct 152. A split bushing is positioned within the axially aligned openings in the ceramic pad up surface area and the head of each bipod of set of double bipod fittings 120. Split bushing 162 is comprised of a metallic material having a substantially similar CTE as metallic duct 112 and double bipod fitting 122. Split bushing 162 takes up bearing loads while also allowing for thermal mismatch of the metallic bushing material and CMC duct material. Split bushing 162 is not flanged on either end and will be captured within the axially aligned openings on either side on the gauge thickness by washers or a spring loaded fastener system. Split bushing 162 prevents chafing, abrasion, and crushing of the bipod and CMC duct. The constant torque on the joint, provided by the spring loaded fastener, will keep the bushings in place throughout the temperature spectrum while also allowing axial growth that will not deleteriously affect the CMC structure.

In this illustrative example of engine exhaust structure 102, seal 160 is attached to metallic duct 112 and in contact with CMC duct 152. In this illustrative example, seal 160 is a compressible metal seal attached to metallic duct 112 and spring loaded or compressed into contact with CMC duct 152. Seal 160 is a flexible formed sheet metal spring seal.

Seal 160 is attached to metallic duct 112 and in contact with CMC duct 152 in an area of overlap 164 common to both metallic duct 112 and CMC duct 152. Seal 160 may be welded to metallic duct 112. Seal 160 is comprised of a compressible, metallic sheet material having a substantially similar CTE as metallic duct 112. For example, seal 160 may be comprised of a galvanically compatible material that is similar or identical in CTE to metallic duct 112 and the hardware used to attach metallic duct 112 to the aft end of and aircraft engine.

Seal 160 is compressed or folded between metallic duct 112 and CMC duct 152. Under high exhaust temperatures, as metallic duct 112 expands relative to CMC duct 152 and a gap between the two grows, the flexible nature of seal 160, attached to metallic duct 112, allows seal 160 to maintain contact with CMC duct 152. Seal 160 prevents air leakage through the joined interface between metallic duct 112 and CMC duct 152.

Each bipod of set of double bipod fitting 122 connects to the CMC duct at a single point (i.e. a spring loaded fastener). The thermal enforced deflection on a given bipod leg member from the CMC duct is in a single radial direction. The planar surfaces of a given bipod leg member are such that the single radial direction loading induces simple flat plate bending in the bipod leg planar sections. The bending loads for each of the bipod leg member planar sections is normal to the plane and therefore induces simple bending stresses. As the section is a simple thin plate in bending, the induced stress for a given amount of deflection is low.

Figure 2:
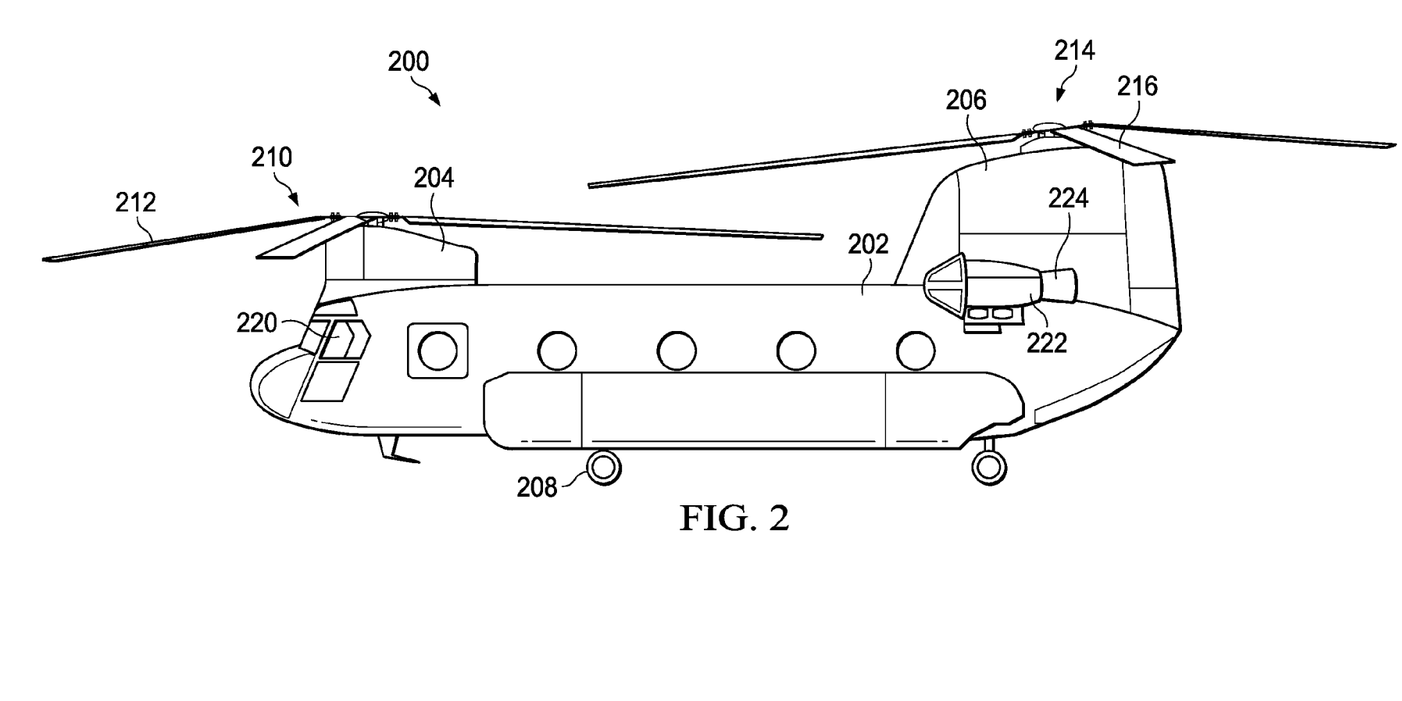
FIG. 2 is an illustration of an aircraft in accordance with an illustrative embodiment.

With reference next to FIG. 2, an illustration of an aircraft is depicted in accordance with an illustrative embodiment. In this illustrative example, aircraft 200 takes the form of a tandem rotor helicopter. In this illustrative example, aircraft 200 is an example of one implementation for aircraft 104 shown in block form in FIG. 1.

As depicted, aircraft 200 includes fuselage 202, front pylon 204, rear pylon 206, and landing gear 208. Front pylon 204 includes rotor system 210 equipped with a transmission (not shown in this view) and blades 212. Rear pylon 206 includes rotor system 214 equipped with a transmission (not shown in this view) and blades 216.

In this illustrative example, fuselage 202 of aircraft 200 has cockpit 220. Aircraft 200 includes engine 222. Engine 222 include engine exhaust structure 224. In this illustrative example, engine exhaust structure 224 is an example of one implementation for engine exhaust structure 102 shown in block form in FIG. 1.

The illustration of aircraft 200 is not meant to limit the manner in which an illustrative example can be implemented in an aircraft. In other illustrative examples, engine exhaust structure 228 can be used in other types of aircraft other than aircraft 200. Other types of aircraft in which an illustrative example can be implemented include, for example, a commercial passenger aircraft, a single rotor helicopter, a tiltrotor aircraft, a tilt wing aircraft, a vertical takeoff and landing aircraft, a military jet, a cargo aircraft, a cargo jet, or other suitable type of aircraft.

Figure 3:
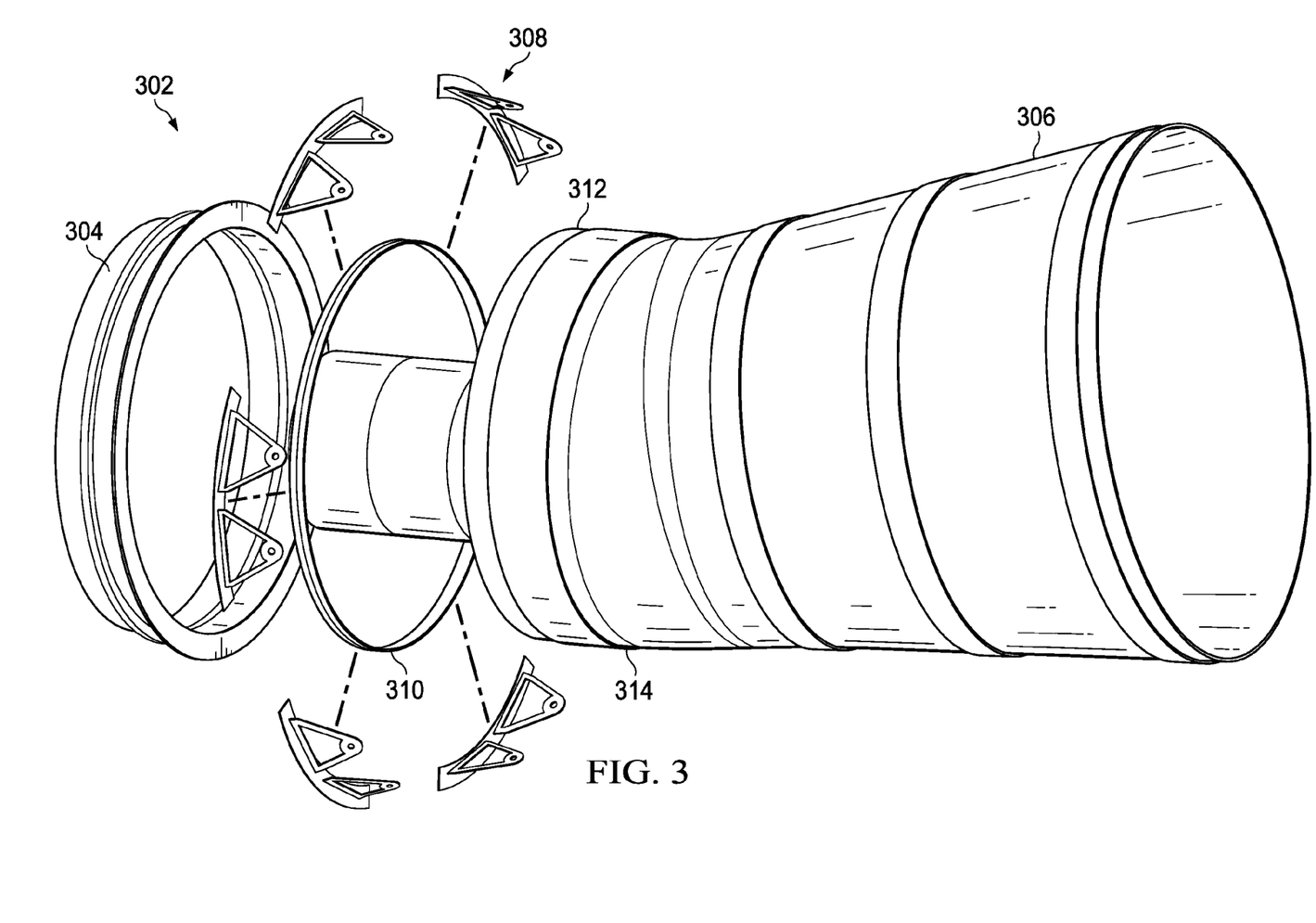
FIG. 3 is an illustration of an exploded view of engine exhaust structure in accordance with an illustrative embodiment.
Figure 4:
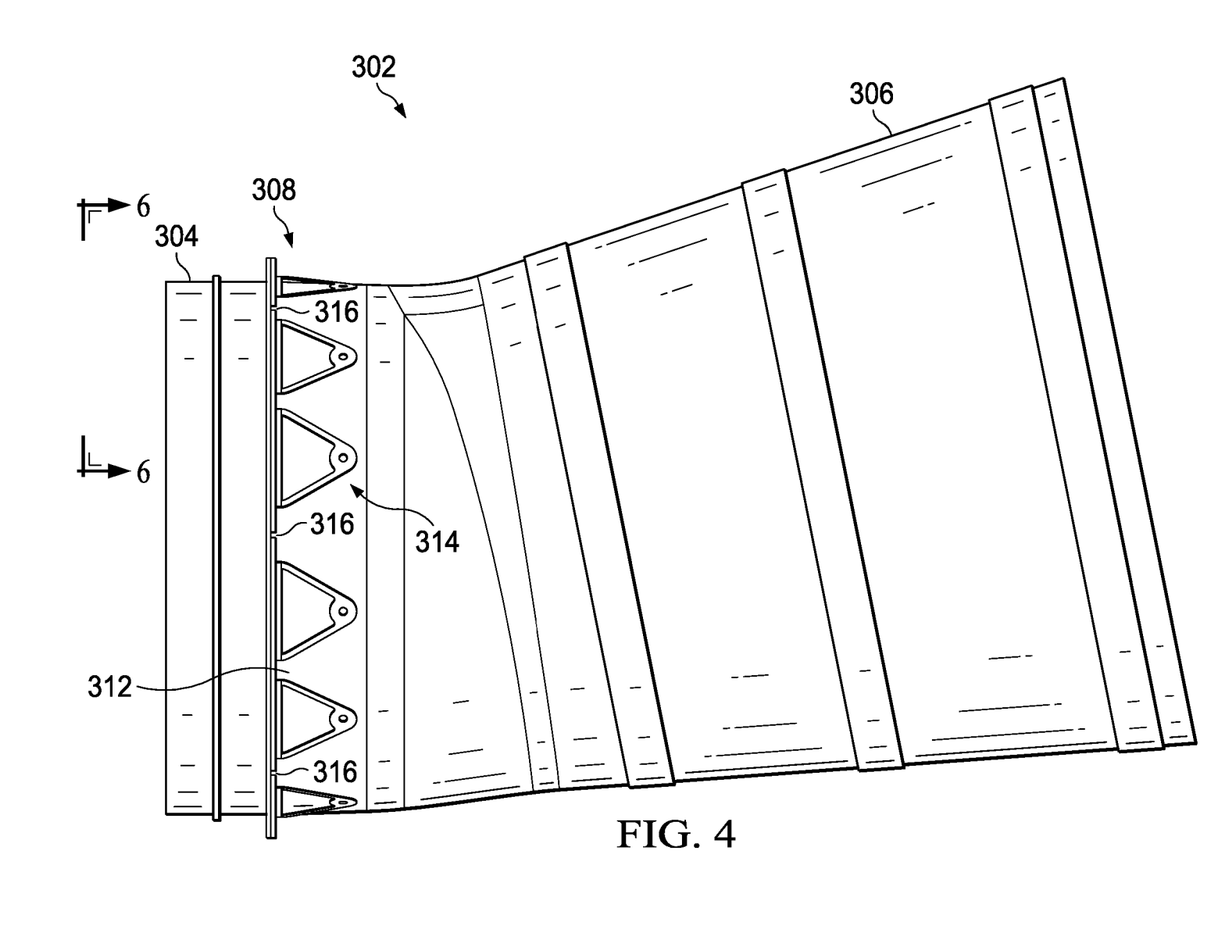
FIG. 4 is an illustration of engine exhaust structure in accordance with an illustrative embodiment.

With reference next to FIG. 3 and FIG. 4, an illustration of components of an engine exhaust structure is depicted in accordance with an illustrative example. In the illustrative examples, the same reference numeral may be used in more than one figure. This reuse of a reference numeral in different figures represents the same element in the different figures. The components illustrated in FIG. 3 and FIG. 4 are examples of physical implementations of metallic duct 112, CMC duct 152, set of double bipod fittings 120, and seal 160 shown in block form in FIG. 1.

As illustrated, engine exhaust structure 302 includes metallic duct 304, CMC duct 306, set of double bipod fittings 308, and seal 310.

Metallic duct 304 is an example of an engine attach bracket that mimics shear bolt attachment points that exist on an aircraft engine. Metallic duct 304 is configured to be attached to the aft end of an engine of an aircraft.

In this illustrative example, metallic duct 304 is joined to CMC duct 306 with set of double bipod fittings 308. Metallic duct 304 has a higher coefficient of thermal expansion (CTE) than CMC duct 306. As a result, under the high exhaust temperatures experienced by engine exhaust structure 302, metallic duct 304 will grow and expand at a different rate than that of CMC duct 306. Set of double bipod fittings provide a thermal coupling between metallic duct 304 and CMC duct 306.

Each bipod of each double bipod fitting of set of double bipod fittings 308 can flex in a single radial direction in order to accommodate a difference in thermal expansion between metallic duct 304 having the higher CTE and the CMC duct 306 having the lower CTE across the full temperature spectrum that engine exhaust structure 302 will experience during operation. A base flange of each double bipod fitting of set of double bipod fittings 308 is attached to a circumferential flange extending from metallic duct 304. Gap 316 exists laterally between each double bipod fitting as set of double bipod fittings 308 is attached circumferentially around metallic duct 304. Gap 316 between each double bipod fitting accounts for manufacturing tolerance stackup and thermal growth. Each double bipod fitting of set of double bipod fittings 308 does not contact the adjacent double bipod fitting as set of double bipod fittings 308 is attached around the circumference of metallic duct 304. As a result, the base flanges of each double bipod fitting of set of double bipod fittings 308 are discontinuous around the circumference of metallic duct 304.

Set of double bipod fittings are attached to CMC duct 306 in pad up surface area 312 of CMC duct 306. Pad up surface area 312 includes additional thickness stacked on top of a base laminate thickness of CMC duct 306. Pad up surface area 312 provides reinforcement and further includes openings 314. Seal 310 is attached to metallic duct 304 and in contact with CMC duct 306.

Figure 5:
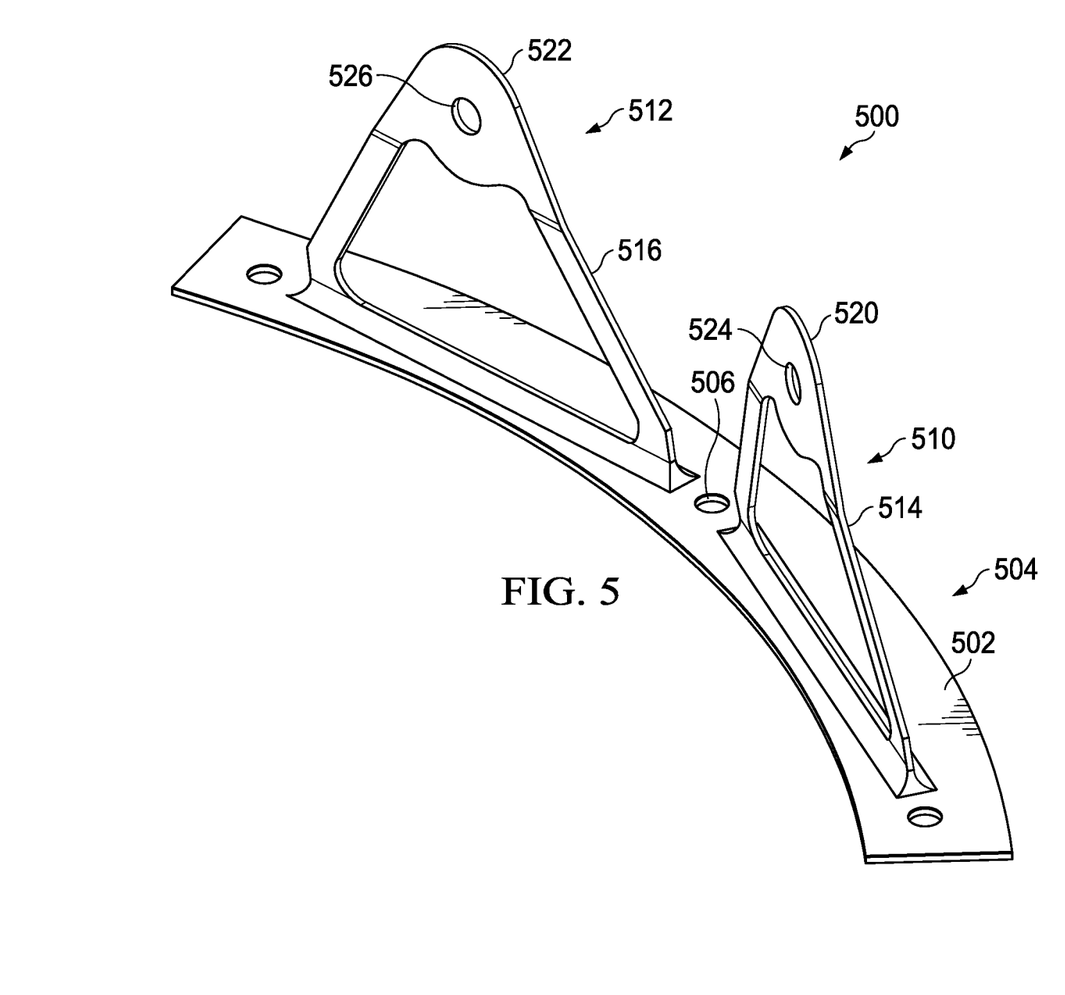
FIG. 5 is an illustration of a double bipod fitting in accordance with an illustrative embodiment.

With reference next to FIG. 5, an illustration of a double bipod fitting is depicted in accordance with an illustrative example. In this figure, a perspective view of double bipod fitting 500 is shown. The components illustrated in FIG. 5 are examples of physical implementations of double bipod fitting 122 shown in block form in FIG. 1 and as a lone double bipod fitting of set of double bipod fittings 308 depicted in FIG. 3 and FIG. 4. Double bipod fitting 500 may be comprised of titanium, stainless steel, Inconel®, or any other metal capable of sustaining high exhaust temperatures. Double bipod fitting 500, for example, may be fabricated of Inconel® 625.

In this illustrative example, double bipod fitting 500 includes base flange 502. Base flange 502 has arc shape 504. Arc shape 504 is conformal to a circumferential curvature of metallic duct 304. Base flange 502 includes openings 506 equally spaced through its arc shaped length. Openings 506 are used to mount base flange 502 to a flange of metallic duct 304 with bolts in a tension joint.

Double bipod fitting 500 includes first bipod 510 and second bipod 512. First bipod 510 includes leg members 514 extending distally from base flange 502 and converging at head 520. Head 520 includes opening 524 sized to receive a spring loaded fastener in order to attach head 520 of first bipod 510 to CMC duct 306. Opening 524 is axially aligned with an opening of openings 314 in a pad up surface area 312 of CMC duct 306. Second bipod 512 includes leg members 516 extending distally from base flange 502 and converging at head 522. Head 522 includes opening 526 sized to receive a spring loaded fastener in order to attach head 522 of second bipod 512 to CMC duct 306. Opening 526 is axially aligned with another opening of openings 314 in pad up surface area 312 of CMC duct 306. The components of double bipod fitting 500 may be integrally formed or first bipod 510 and second bipod 512 may be welded to base flange 502.

Figure 6:
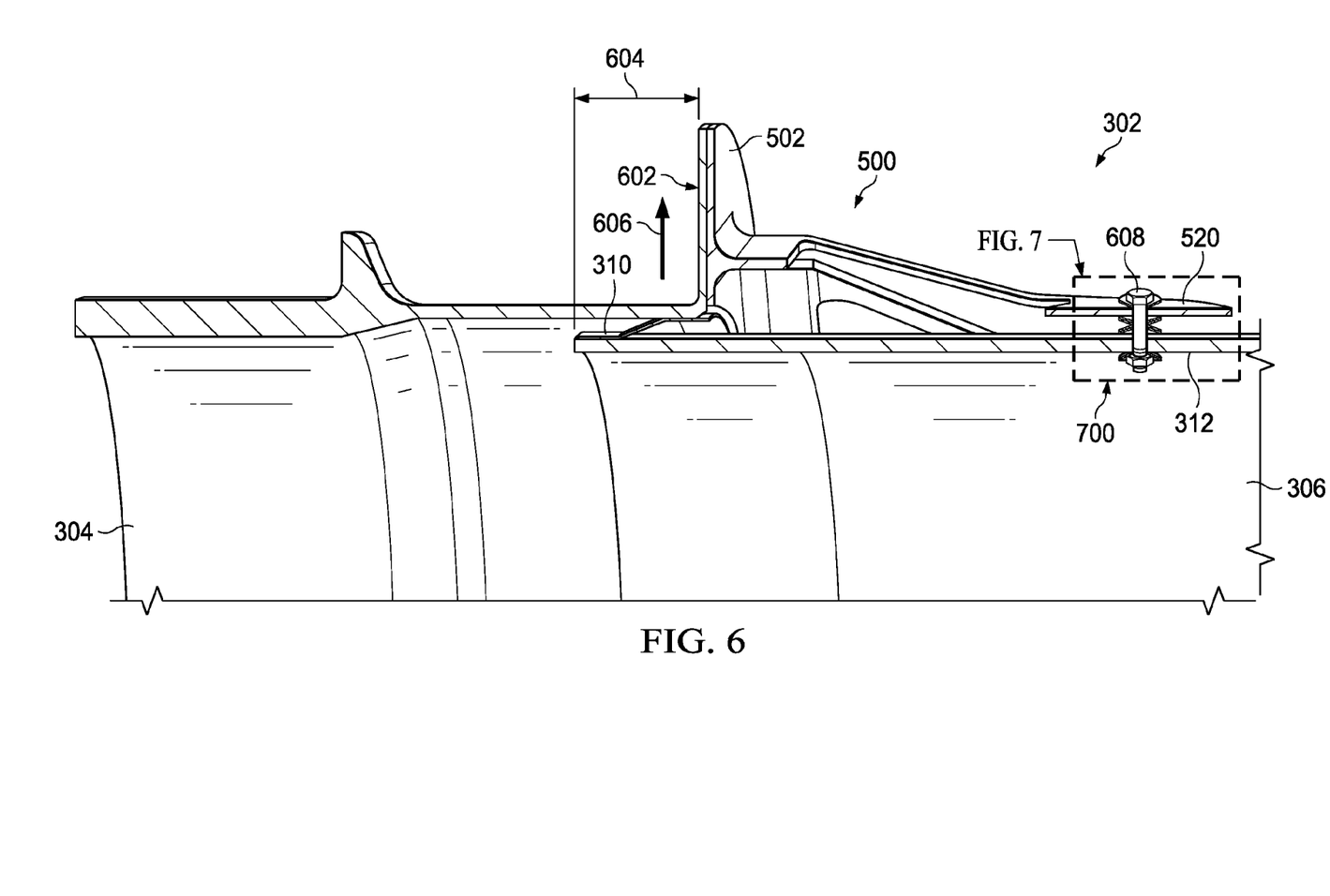
FIG. 6 is an illustration of a cross-sectional view of an engine exhaust structure in accordance with an illustrative embodiment.

Turning now to FIG. 6, an illustration of a partial cross-sectional view of an engine exhaust structure is depicted in accordance with an illustrative example. This cross-sectional view of engine exhaust structure 302 is taken along lines 6-6 in FIG. 4.

In this view, CMC duct 306 is shown joined to metallic duct 304 with double bipod fitting 500. It is understood by one of ordinary skill in the art that a set of double bipod fittings, spaced evenly around the circumference of metallic duct 304 and CMC duct 306, are used to join CMC duct 306 to metallic duct 304.

A base flange of double bipod fitting 500, for example, base flange 502 depicted in FIG. 5, is attached to flange 602 extending from metallic duct 304 in order to mount double bipod fitting 500 to metallic duct 304. Metallic duct 304 includes flange 602. Flange 602 extends from around the circumference of metallic duct 304 in a direction substantially perpendicular to the longitudinal center axis of metallic duct 304. Openings (not shown) in flange 602 and openings 506 in base flange 502 depicted in FIG. 5 are used to mount double bipod fitting 500 to metallic duct 304 with bolts in a tension joint.

CMC duct 306 has a slightly smaller diameter than metallic duct 304, therefore overlap 604 is present where metallic duct 304 and CMC duct 306 are joined.

Seal 310 is mounted to metallic duct 304 and in contact with CMC duct 306 in overlap 604. In this illustrative example, seal 310 is a flexible formed sheet metal spring seal. Seal 310 is attached to metallic duct 304 and in contact with CMC duct 306 in area of overlap 604. The length of overlap 604 is driven by structural requirements. At a given thickness of the ducts, there is an appropriate length of overlap 604 to take up the radial loads which may be experienced during use of the engine exhaust system. The length of overlap 604 would be lessened as the thickness of the ducts increases. The length of overlap 604 is driven by the radial loads of the ducts while optimized for weight.

Seal 310 may be welded to metallic duct 304. Seal 310 is compressed or folded between metallic duct 304 and CMC duct 306. Under high exhaust temperatures, as metallic duct 304 expands in direction 606, the flexible nature of seal 310, attached to metallic duct 304, allows seal 310 to maintain contact with CMC duct 306. Seal 310 prevents air leakage through the joined interface between metallic duct 304 and CMC duct 306.

A head of double bipod fitting 500, for example, head 520 of first bipod 510 depicted in FIG. 5, is attached to CMC duct 306 at pad up surface area 312 with spring loaded fastener 608 in order to attach double bipod fitting 500 to CMC duct 306. Spring loaded fastener 608 is shown in greater detail in FIG. 7. A spring loaded fastener, for example, spring loaded fastener 608, is used to attach each head of each bipod of each double bipod fitting to CMC duct 304.

At the area of attachment, where head 520 is attached to CMC duct 306 at pad up surface area 312, spring loaded fastener 608 allows the torque preload on the fastener to be maintained throughout the temperature spectrum the engine exhaust structure will encounter. Maintaining the preload on spring loaded fastener 608 ensures that spring loaded fastener 608 will not back off or disengage.

Figure 7:
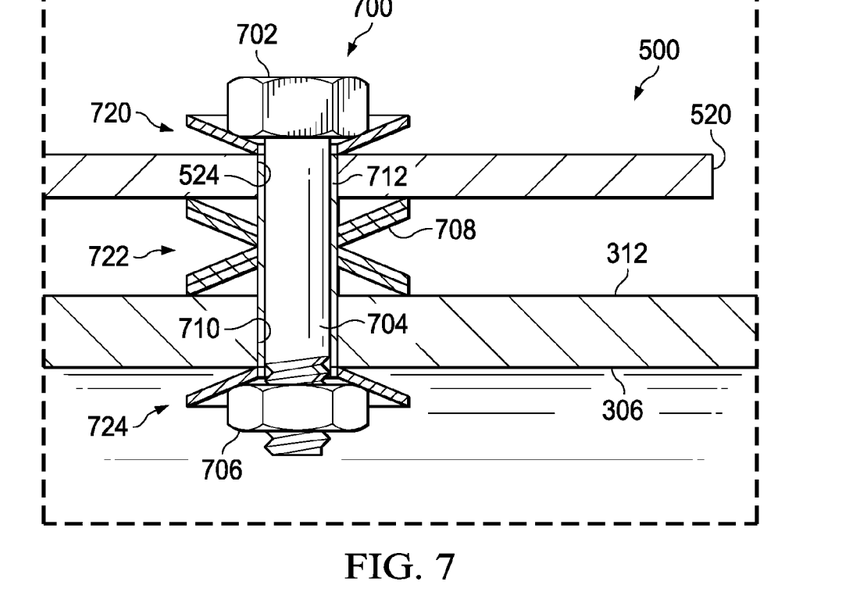
FIG. 7 is an illustration of a cross-sectional view of a spring loaded fastener in accordance with an illustrative embodiment.

With reference to FIG. 7, an illustration of a cross-sectional view of a head of a bipod connected to a CMC duct with a spring loaded fastener is depicted in accordance with an illustrative embodiment. In this figure, spring loaded fastener 700 is shown. The components illustrated in FIG. 7 are examples of physical implementations of spring loaded fastener 146 or spring loaded fastener 148 shown in block form in FIG. 1 and spring loaded fastener 608 depicted in FIG. 6.

Spring loaded fastener 700 includes head 702 connected to shaft 704. Shaft 704 is threadably engaged with nut 706. Shaft 704 of spring loaded fastener 700 passes through axially aligned openings in the pad up surface area and the head of each bipod. Shaft 704 of spring loaded fastener 700 passes through opening 524 in head 520 and opening 710 in pad up surface area 312 of CMC duct 306. Opening 710 is an example of an opening of openings 158 shown in block form in FIG. 1 and an opening of openings 314 depicted in FIG. 3 and FIG. 4. Opening 524 and opening 710 are axially aligned.

In this illustrated example, Belleville washers 708 are positioned on shaft 704 and between head 702 and head 520 at position 720. Belleville washers 708 are stacked on shaft 704 between head 520 and pad up surface area 312 of CMC duct 306 at location 722. Belleville washers 708 are positioned on shaft 704 and between CMC duct 306 and nut 706 at position 724. Belleville washers 708 are frustoconical shaped discs providing the washer with a spring characteristic. Positions 720 and 724 may not require Belleville washers as standard disc shaped washers will suffice in these positions. Washers at positions 720 and 724 contain split bushing 712 within axially aligned openings 524 and 710, mitigate cracking between and protect the CMC material, protect the head of the bipod from wear, and add a measure of corrosion protection.

A respective spring loaded fastener 700 directly attaches each head of each bipod of set of double bipod fittings 308 to CMC duct 306.

In this illustrative example, split bushing 712 is positioned within the axially aligned openings of the head of the bipod and the pad up surface area of the CMC duct, for example, opening 524 and opening 710. Split bushing 712 is shown in greater detail in FIG. 8.

Split bushing 712 is comprised of a metallic material having a substantially similar CTE as double bipod fitting 500. Split bushing 712 takes up bearing loads while also allowing for thermal mismatch of the metallic bushing material and CMC duct material. Split bushing 712 is not flanged on either end and is captured within the axially aligned openings 524 and 710 on both sides of the head of the bipod and the pad up surface area of the CMC duct by Belleville washers. Split bushing 712 prevents chafing, abrasion, and crushing of the bipod and CMC duct. The constant torque on the joint, provided by spring loaded fastener 700, will keep the split bushing 712 in place throughout the temperature spectrum while also allowing axial growth that will not deleteriously affect the CMC structure.

Figure 8:
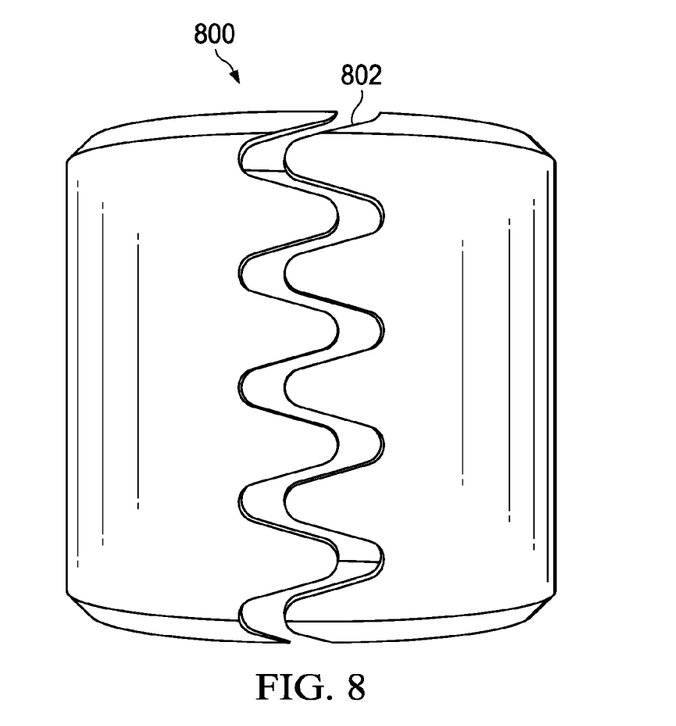
FIG. 8 is an illustration of a split bushing in accordance with an illustrative embodiment.

In reference to FIG. 8, an illustration of a split bushing is depicted in accordance with an illustrative embodiment. In this depicted example, split bushing 800 is an example of physical implementations of split bushing 162 shown in block form in FIG. 1 and split bushing 712 depicted in FIG. 7.

Split bushing 800 is generally cylindrical in shape and sized to be positioned within the axially aligned openings of the head of the bipod and the pad up surface area of the CMC duct, for example, opening 524 and opening 710. Split bushing 800 includes gap 802. Gap 802 allows split bushing to expand and contract within the axially aligned openings.

Figure 9:
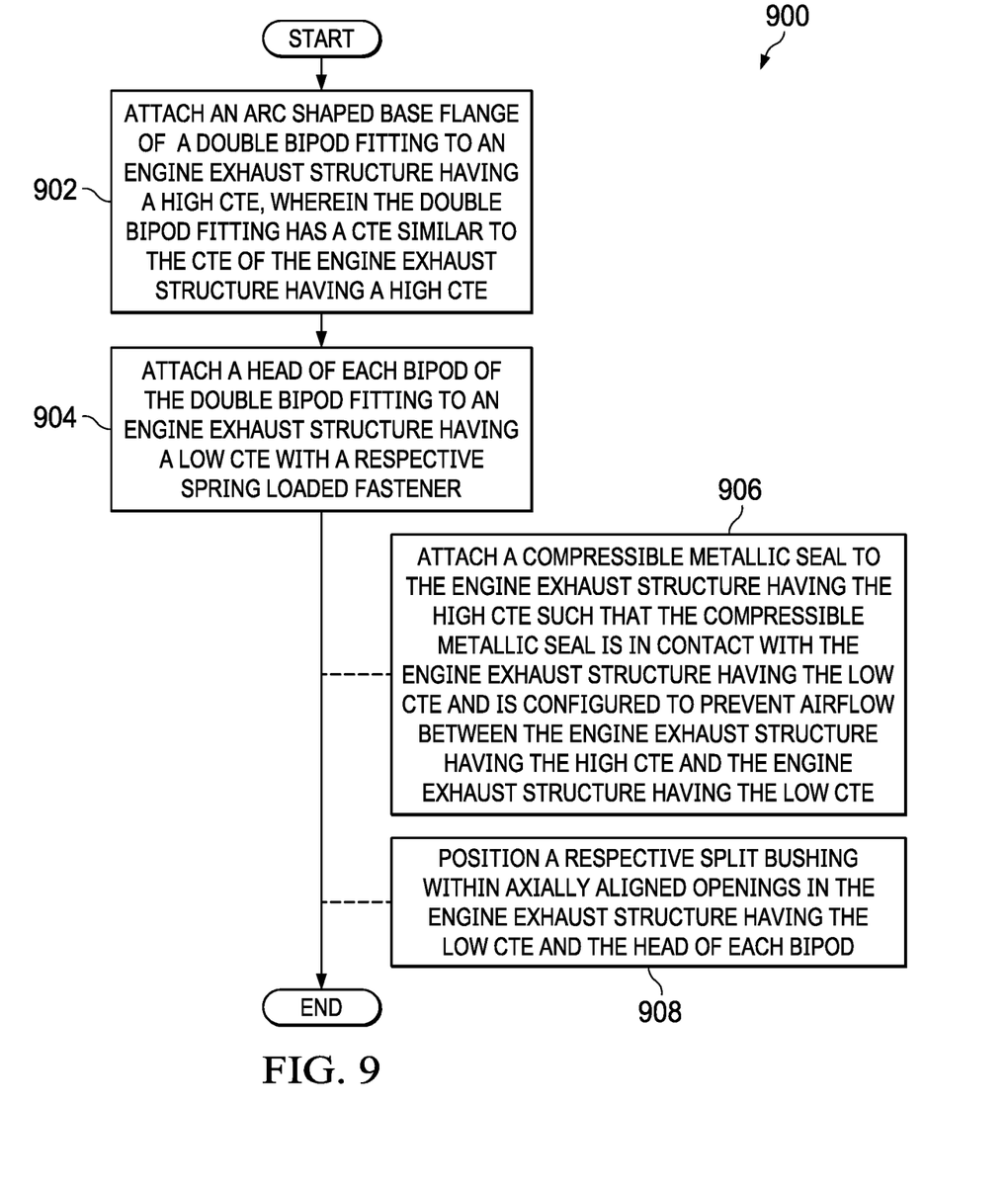
FIG. 9 is an illustration of a flowchart of a process for mitigating thermal loading between engine exhaust structures having different coefficients of thermal expansion in accordance with an illustrative embodiment.

With reference next to FIG. 9, an illustration of a flowchart of a process 900 mitigating thermal loading between engine exhaust structures having different coefficients of thermal expansion (CTE) is depicted in accordance with an illustrative embodiment. The method depicted in FIG. 9 may be used in conjunction with the engine exhaust structure depicted in FIGS. 1-8.

The process begins by attaching an arc shaped base flange of a double bipod fitting to an engine exhaust structure having a high CTE. The double bipod fitting has a CTE similar to that of the engine exhaust structure having the high CTE (operation 902). The process attaches a head of each bipod of the double bipod fitting to an engine exhaust structure having a low CTE with a respective spring loaded fastener (operation 904). At operation 906, the process attaches a compressible metallic seal to the engine exhaust structure having the high CTE such that the compressible metallic seal is in contact with the engine exhaust structure having the low CTE. The compressible metallic seal is configured to prevent airflow between the engine exhaust structure having the high CTE and the engine exhaust structure having the low CTE. At operation 908, the process positions a respective split bushing within axially aligned openings in the engine exhaust structure having the low CTE and the head of each bipod.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
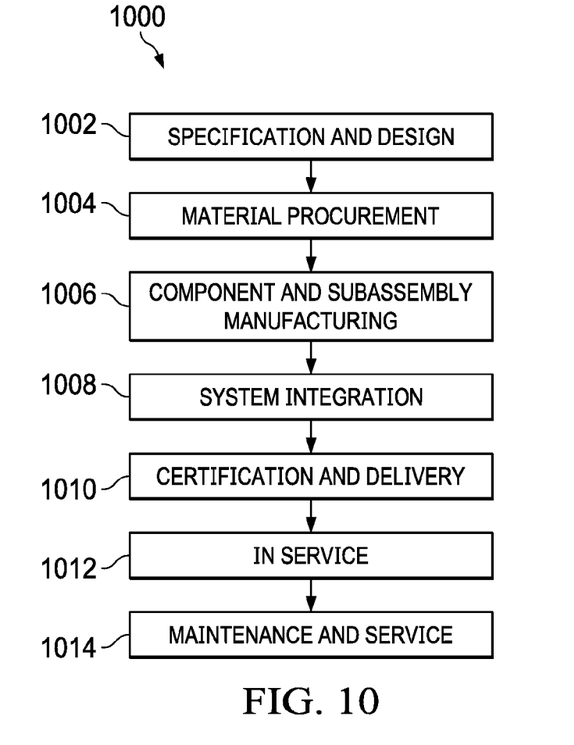
FIG. 10 is an illustration of a block diagram of an aircraft manufacturing and service method in accordance with an illustrative embodiment.
Figure 11:
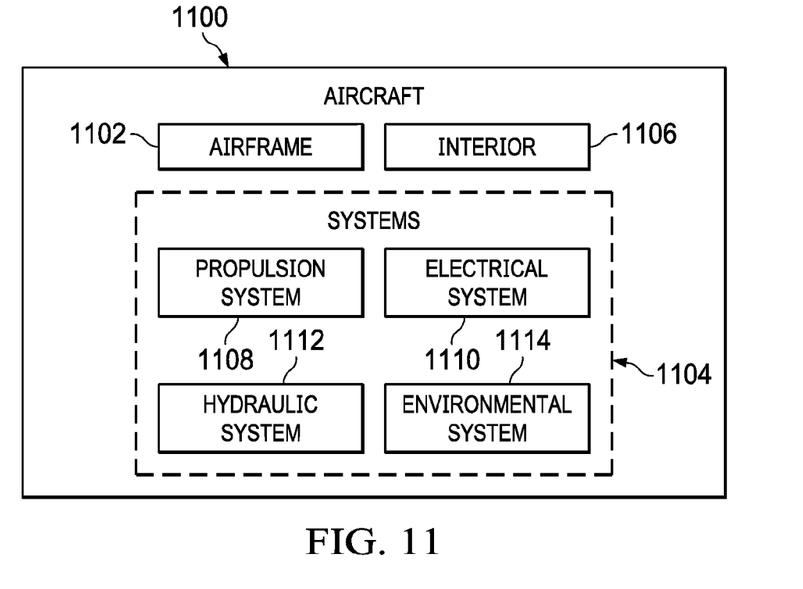
FIG. 11 is an illustration of a block diagram of an aircraft in which an illustrative embodiment may be implemented.

The illustrative embodiments of the disclosure may be further described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance, service, or inspection.

Engine exhaust structure 102 may be installed on an aircraft during component and subassembly manufacturing 1006. In addition, engine exhaust structure 102 may be retrofitted onto aircraft 1100 in FIG. 11 during routine maintenance and service 1014 as part of a modification, reconfiguration, or refurbishment of aircraft 1100 in FIG. 11.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014, inclusive of inspection, in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An engine exhaust structure comprising:
 a metallic duct portion configured to be attached to an aft end of an aircraft engine;
 a ceramic duct portion; and
 a set of double bipod fittings equally spaced around the circumferences of both the metallic duct portion and the ceramic duct portion, wherein a gap exists laterally between each double bipod fitting such that each double bipod fitting does not contact an adjacent double bipod fitting;

wherein each double bipod fitting of the set of double bipod fittings comprises a base flange formed in an arc shape and attached to the metallic duct portion, the arc shape conformal to a curvature of the metallic duct portion;

wherein each bipod of each double bipod fitting comprises:
leg members extending from and integrally formed with the base flange and converging at a head, the head attached to the ceramic duct portion; and
a spring loaded fastener configured to attach the head to the ceramic duct portion.

2. The engine exhaust structure of claim 1, wherein each bipod of the double bipod fitting is configured to flex in a single radial direction in order to accommodate a difference in thermal expansion between the metallic duct portion and the ceramic duct portion.

3. The engine exhaust structure of claim 1, further comprising:
a compressible metallic seal attached to the metallic duct portion and in contact with the ceramic duct portion in an area of overlap common to both the metallic duct portion and the ceramic duct portion.

4. The engine exhaust structure of claim 3, wherein the compressible metallic seal is configured to prevent airflow between the metallic duct portion and the ceramic duct portion.

5. The engine exhaust structure of claim 1, wherein the ceramic duct portion includes a ceramic pad up surface area at the connection location of each bipod of the double bipod fitting to the ceramic duct portion.

6. The engine exhaust structure of claim 5, wherein the spring loaded fastener passes through axially aligned openings in the ceramic pad up surface area and the head of each bipod.

7. The engine exhaust structure of claim 6, further comprising:
a split bushing positioned within the axially aligned openings in the ceramic pad up surface area and the head of each bipod.

8. The engine exhaust structure of claim 1, wherein the metallic duct portion comprises a vertical flange connected to the base flange of each bipod of the double bipod fitting.

9. The engine exhaust structure of claim 1, wherein the metallic duct portion is an engine attach bracket that mimics shear bolt attachment points that exist on the aircraft engine.

10. The engine exhaust structure of claim 1, wherein the spring loaded fastener is configured to maintain a torque preload applied to the attachment between the head and the ceramic duct portion through a temperature spectrum experienced by the metallic duct portion and the ceramic duct portion during use of the aircraft engine.

11. A set of double bipod fittings configured to mitigate thermal loading of a structure having a high coefficient of thermal expansion (CTE) connected to a structure having a low CTE by the set of double bipod fittings, comprising:
a gap laterally between each double bipod fitting of the set of double bipod fittings such that each double bipod fitting does not contact an adjacent double bipod fitting;
wherein each double bipod fitting of the set of double bipod fittings comprises:
a first bipod mounted on a base flange, the base flange formed in an arc shape and connected to a flange of the structure having the high CTE, the arc shape conformal to a curvature of the structure having the high CTE;
a second bipod mounted on the base flange;
the first bipod comprising a first pair of leg members extending from the base flange and converging at a first head, wherein a first spring loaded fastener connects the first head to the structure having the low CTE; and
the second bipod comprising a second pair of leg members extending from the base flange and converging at a second head, wherein a second spring loaded fastener connects the second head to the structure having the low CTE;
wherein the first pair of leg members extend from and are integrally formed with the base flange and the second pair of leg members extend from and are integrally formed with the base flange.

12. The set of double bipod fittings of claim 11, further comprising:
a compressible metallic seal attached to the structure having the high CTE and in contact with the structure having the low CTE.

13. The set of double bipod fittings of claim 12, wherein the compressible metallic seal is configured to prevent airflow between the structure having the high CTE and the structure having the low CTE.

14. The set of double bipod fittings of claim 11, wherein the structure having the low CTE includes a pad up surface area at the connection location of the first and second bipods to the structure having the low CTE.

15. The set of double bipod fittings of claim 14, wherein the first spring loaded fastener passes through axially aligned openings in the ceramic pad up surface area and the first head and wherein the second spring loaded fastener passes through axially aligned openings in the ceramic pad up surface area and the second head.

16. The set of double bipod fittings of claim 15, further comprising:
a first split bushing positioned within the axially aligned openings in the ceramic pad up surface area and the first head; and
a second split bushing positioned within the axially aligned openings in the ceramic pad up surface area and the second head.

17. The engine exhaust structure of claim 11, wherein the first bipod and the second bipod are configured to flex in a single radial direction in order to accommodate a difference in thermal expansion between the structure having the low CTE and the structure having the high CTE.

18. A method for mitigating thermal loading between engine exhaust structures having different coefficients of thermal expansion (CTE) connected by a set of double bipod fittings, wherein the engine exhaust structures comprise an engine exhaust structure having a high CTE and an engine exhaust structure having a low CTE, the method comprising:
attaching an arc shaped base flange of each double bipod fitting of the set of double bipod fittings to the engine exhaust structure having the high CTE, the arc shape conformal to a curvature of the engine exhaust structure having the high CTE, wherein each double bipod fitting has a CTE similar to the CTE of the engine exhaust structure having the high CTE and wherein a gap exists laterally between each double bipod fitting equally spaced around both engine exhaust structures having different CTE such that each double bipod fitting does not contact an adjacent one of the double bipod fittings; and
attaching a head of each bipod of each double bipod fitting to the engine exhaust structure having the low CTE with a respective spring loaded fastener, wherein each bipod of each double bipod fitting comprises leg members extending from and integrally formed with a respective one of the arc shaped base flanges and converging at the respective head.

19. The method of claim 18, further comprising:
attaching a compressible metallic seal to the engine exhaust structure having the high CTE such that the compressible metallic seal is in contact with the engine exhaust structure having the low CTE and is configured to prevent airflow between the engine exhaust structure having the high CTE and the engine exhaust structure having the low CTE.

20. The method of claim 18, further comprising:
positioning a respective split bushing within axially aligned openings in the engine exhaust structure having the low CTE and the head of each bipod.

\* \* \* \* \*